United States Patent [19]

Ray et al.

[11] Patent Number: 5,419,836
[45] Date of Patent: May 30, 1995

[54] CHEMICAL FEED SYSTEM

[75] Inventors: Edgar C. Ray, Naperville, Ill.; Randal J. Meyer, Clearwater, Minn.

[73] Assignee: Nalco Chemical Company, Naperville, Ill.

[21] Appl. No.: 169,257

[22] Filed: Dec. 20, 1993

[51] Int. Cl.⁶ ............................................. C02F 1/76
[52] U.S. Cl. .................................. 210/697; 210/752; 210/756
[58] Field of Search ..................... 210/697, 752, 756

[56] References Cited

U.S. PATENT DOCUMENTS

| | | |
|---|---|---|
| 2,874,719 | 2/1959 | Van Tuyl ............................ 210/697 |
| 3,215,626 | 11/1965 | Console ............................. 210/697 |
| 4,452,713 | 6/1984 | Small ................................ 210/697 |
| 4,634,532 | 1/1987 | Logan et al. ....................... 210/697 |
| 4,804,478 | 2/1989 | Tamir ................................ 210/752 |
| 5,167,866 | 12/1992 | Hwa et al. ......................... 210/756 |
| 5,232,629 | 8/1993 | Boffardi ............................. 210/697 |

*Primary Examiner*—Neil McCarthy
*Attorney, Agent, or Firm*—Robert A. Miller; James J. Drake

[57] ABSTRACT

A chemical feed system for use in industrial fluid systems is disclosed. The system comprises a fluid source, containers for storing additives, pumps for proportionally dispensing the additives, and a filter to remove unwanted matter from the fluid stream. The invention is partially applicable to poultry drinking water systems.

5 Claims, 1 Drawing Sheet

CHEMICAL FEED SYSTEM

BACKGROUND OF THE INVENTION

The present invention relates to the chemical treatment of industrial process waters. More specifically, the present invention provides a chemical feed system for administering additives into a poultry watering system.

The quality of feed water is a never-ending concern in the poultry industry. Watering systems in poultry growout facilities have tremendous impact on the quality of the final poultry product and on bottom line profitability of an operation. Approximately 65% of a bird's intake is water. As a result, ensuring an ample supply of quality water to birds in poultry growout facilities is extremely important.

Currently, the majority of water supplied to such growout facilities is untreated ground water. Well water is generally of sufficient drinking quality. However, due to high levels of dissolved materials, well water can create significant mechanical difficulties and/or failures.

A number of problems in combination cause less than ideal water supply qualities. System scaling and system corrosion are at the forefront of such problems. Scale formation from hard waters will cause water systems to leak. Likewise, aggressive waters will corrode the system and create leaks. Water leakage results in higher labor costs, equipment replacement costs, and further cleaning costs.

Further, water leakage increases moisture levels and leads to early bedding replacement, high ammonia levels, increased ventilation, and decreased building and equipment life. Wet litter resulting from leaks will form high ammonia levels and need to be replaced. High ammonia levels in the facility have a direct and detrimental effect on a bird's health and productivity. Increasing ventilation removes the high ammonia from the facility; however, this in turn results in increased electrical use.

In addition to water leakage, the presence of microorganisms, especially bacteria, within the feed water is a vital concern. The water system design, along with moisture, provides an ideal growth condition for a variety of microorganisms. The presence of such microorganisms in poultry water systems adversely affects a bird's growth. The microorganisms affect a bird's health and production by interfering with proper digestion.

Still further, scaling and/or corrosion can cause system failure. Likewise, bacteria fouling can also cause such system failure. In turn, system failure causes substantial water loss. Total water loss can result in reduced production and possibly even death of the poultry in a growout facility.

These factors prevent optimum growth conditions and accordingly have a detrimental effect on the final poultry product. Any effect on growth and bird health will ultimately decrease daily poundage gained. As a result, these birds must be housed longer, causing reduced profits and possibly reduced growout storage space for new birds. Further, less than optimum growth conditions requires more feed consumption per pound of weight increase.

An approach that has been used for increasing the quality of feed water is a chemical feed system. The chemical feed system administers chemical additives to water systems in poultry barns. The chemical additives inhibit scale, corrosion and microbial growth as well as sterilize the water. Electrical suction pumps dispense the chemicals into the water stream. The suction pumps in such systems are wired to operate when the well pump operates.

While these current chemical feed systems may increase water quality, a number of disadvantages are apparent with such a system. For example, a disadvantage is the need to use electronically operated feed pumps. The use of electricity limits the available locations in which the chemical feed system may be positioned. As a result, the chemical feed system may not be positioned at the most optimal place within the water system.

Still further, electrical pumps provide only minimal accuracy. For instance, electrical pump systems do not allow for proportional administering of the chemical additives into the water stream.

Therefore, a need exists for an improved chemical feed system for use in poultry watering systems.

SUMMARY OF THE INVENTION

The present invention provides a system and method for administering additives to a water stream. The system includes hydraulic pumps for proportionally dispensing the additives into the water stream.

To this end, the present invention relates to an improved chemical feed system for use in industrial water systems. The chemical feed system includes a water source for supplying a water stream to the system. Containers store additives that are administered to the water stream. Feed pumps, such as hydraulic pumps, proportionally dispense the additives into the water stream. Then, a filter removes unwanted matter from the fluid stream prior to transport to the poultry.

In an embodiment, the system comprises a mixing chamber for mixing at least one additive with the water stream prior to adding additional additives.

In an embodiment, two additives are dispensed into the water stream. In such an embodiment, the mixing chamber mixes the first additive with the water stream prior to the addition of the second additive into the water stream. In a preferred embodiment, the first additive is an inhibitor chemical and the second additive is an oxidant.

The present invention further provides a method for dispensing additives into a water stream. The method comprises the steps of supplying a water stream to the chemical feed system, proportionally dispensing a plurality of additives into the water stream, and filtering unwanted matter from the water stream. In an embodiment, hydraulic pumps proportionally dispense the additives into the water stream.

In an embodiment, the method of the present invention further comprises the step of mixing at least one additive with the water stream prior to adding another additive into the water stream.

An advantage of the present invention is that it provides an improved method and system for administering chemical additives to a water stream.

Another advantage of the present invention is that it provides a hydraulically operated proportional chemical feed system. The use of hydraulic pumps eliminates the need for electrical hookups, requiring less maintenance of the system.

Moreover, an advantage of the present invention is that it provides a system that can be easily installed anywhere within the watering system. As opposed to prior systems, the present chemical feed system is not dependent on an electrical supply source. An electrical supply source requires actuation by a well pump or a contacting head water meter and a timer.

Still further, an advantage of the present invention is that it provides a system and method with increased accuracy over prior systems.

Additional features and advantages of the present invention are described in, and will be apparent from, the detailed description of the presently preferred embodiments and from the drawing.

BRIEF DESCRIPTION OF THE DRAWING

The FIGURE illustrates schematically an embodiment of the chemical feed system of the present invention.

DETAILED DESCRIPTION OF THE PRESENTLY PREFERRED EMBODIMENTS

Figure 1:
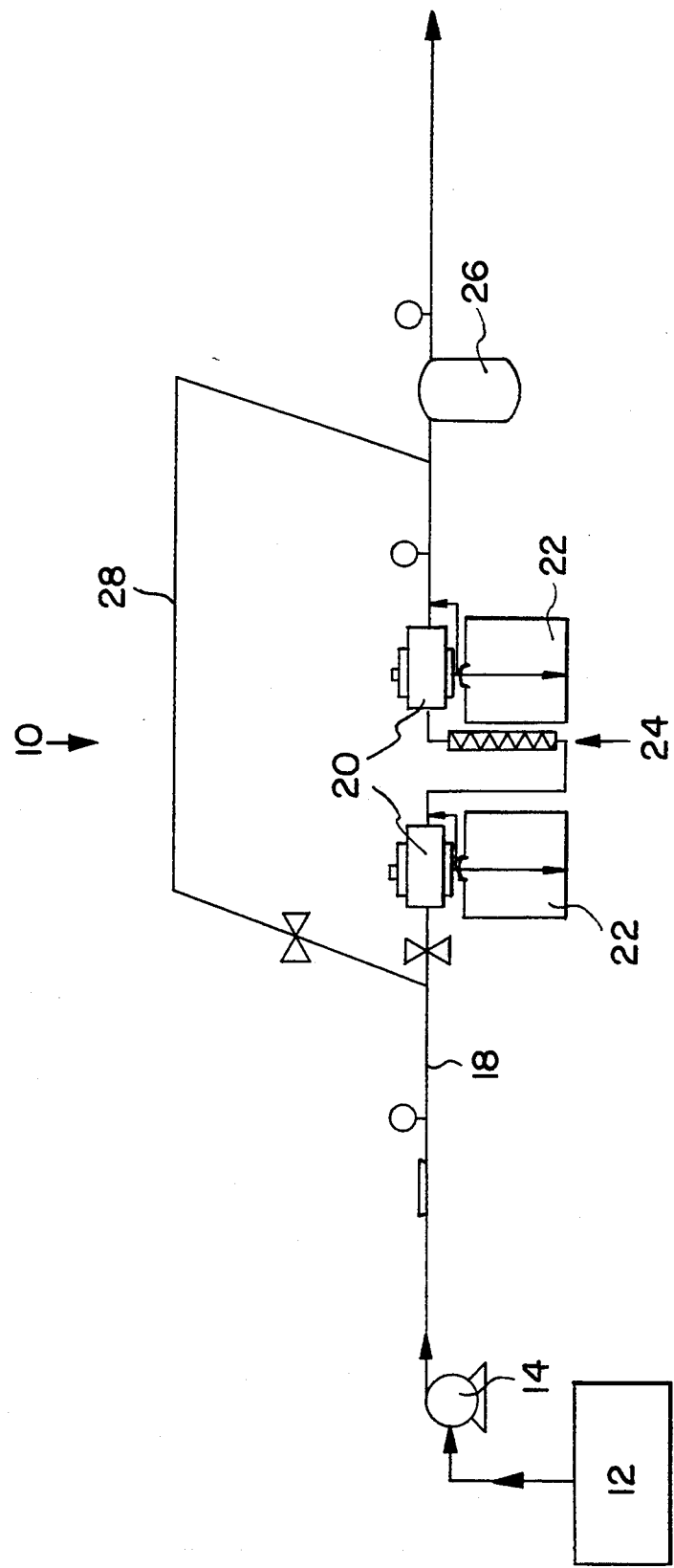

The present invention provides a system and method for proportionally administering chemical additives into a fluid stream.

Referring now to the figure, an embodiment of the chemical feed system 10 for administering chemical additives to a water stream is schematically illustrated. A water source 12 supplies the water for the system 10. An inlet pump 14 draws the water from the water source 12. The inlet pump 14 may be either a well pump or a circulation pump.

The inlet pump 14 is connected to substantially continuous length of conduit 18, such as tubing members, piping or the like. The conduit 18 circulates the water infed from the water source 12 through the system 10.

The system 10 includes a plurality of hydraulic pumps 20 and a corresponding number of feed containers 22. A commercial hydraulic pump that may be used in the present invention is MSR H305G 0.4 that can be obtained from MSR GMBH, Am Heiligenstock, Germany. While a number of different feed containers 22 may be used, suitable examples are a 5 gallon pail or a 15 gallon drum.

The system also includes a filter 26. A commercial filter that may be used in the present invention is a Teel Cartridge Filter, having a pore size of 1 to 20 microns. This type of filter may be obtained from Grainger. In addition, the system 10 may include a bypass line 28.

In use, the pump 14 draws water from the water source 12. The pump 14 then forces the water through the hydraulic pumps 20. The hydraulic pumps 20 proportionally add a plurality of additives to the conduit 18. The hydraulic pumps 20 draw the additives from the feed containers 22 and add the additives to the conduit 18. In an embodiment, the additives are an inhibitor chemical and an oxidant, such as water soluble alkali metal phosphates and chlorine generally in the form of an aqueous solution of sodium hypochlorite respectively.

The hydraulic pumps 20 provide advantages over the prior use of electrical pumps. The hydraulic pumps 20 provide a means to add proportional amounts of the additives at very low dosages, such as 0 to 400 ppm, with widely varying water flow rates, the system 10 provides uniform addition of the additives to the conduit 18. As a result, the system 10 of the present invention is potentially far more accurate than earlier systems.

The hydraulically operated pumps 20 further allow for the use of the system 10 in poultry barns without wells. In addition to use with traditional ground water wells, the system 10 may be used with a city water supply or a central well supply. Unlike prior systems, the system 10 may be positioned anywhere in the conduit 18 along a water drinking system. The hydraulic pumps 20 need not be positioned near a well pump and operate independently of such pumps.

In an embodiment, the system 10 further includes a mixing chamber 24. A commercial mixing chamber that may be used in the present invention is Koflo motionless mixer. This mixing chamber may be obtained from Nalco Chemical Company. When a single mixing chamber 24 is utilized, at least two hydraulic pumps 20 are used to add at least two additives to the conduit 18. In a preferred embodiment, one hydraulic pump 20 draws an inhibitor chemical, such as phosphate, from one feed container 22. A second hydraulic pump 20 draws an oxidant, such as chlorine, from another feed container 22.

Initially, the inhibitor chemical is added to the conduit 18. Next, the mixing chamber 24 mixes the inhibitor chemical with the water stream. This mixing of the inhibitor chemical with the water stream provides sufficient reaction time for the inhibitor chemical. After the complete mixing of the inhibitor chemical with the water stream, the oxidant is added to the conduit 18.

Then, the water stream flows through the filter 26. The filter 26 removes unwanted matter, such as precipitate, from the water stream. Ultimately, the water stream flows into drinking corrals in the poultry barn.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for dispensing a plurality of additives into the untreated ground water contained in a poultry watering system consisting of the steps of:
   supplying untreated ground water to a poultry watering system;
   circulating the water through a conduit of such poultry watering system;
   fluidly connecting a plurality of feed containers containing the plurality of additives to the water contained in said conduit, the additives including a scale inhibitor and an oxidant;
   proportionately dispensing in relationship to flow through said conduit the plurality of treatment additives into the conduit containing the water using hydraulically operated pumps;
   filtering unwanted matter from the water; and then
   obtaining a water contained in a poultry watering system which contains dispensed therein a plurality of additives.

2. The method of claim 1 wherein the inhibitor chemical is a water soluble alkali metal phosphate and the oxidant is an aqueous solution of sodium hypochlorite.

3. The method of claim 1 further including the step of monitoring the supply of the fluid stream within the system.

4. A method for treating untreated ground water in a poultry drinking water system consisting of the steps of:

supplying untreated ground water to a conduit in the poultry drinking water system;

circulating the water through said conduit of such poultry drinking water system;

fluidly connecting feed containers containing first and second treatment additives to the water contained in said conduit, said first additive comprising a scale inhibitor and said second additive comprising an oxidant;

proportionally dispensing, in relationship to flow through said conduit, said first additive into the water contained in the conduit using an hydraulically operated pump;

mixing said first additive with the water contained in said conduit;

proportionally dispensing, in relationship to flow through said conduit, said second additive into the water contained in the conduit using an hydraulically operated pump;

filtering unwanted matter from the water; and, obtaining a treated poultry drinking water.

5. The method of claim 4 wherein the inhibitor chemical is a water soluble alkali metal phosphate and the oxidant is an aqueous solution of sodium hypochlorite.

* * * * *